(12) United States Patent
Thomas

(10) Patent No.: US 8,621,846 B2
(45) Date of Patent: Jan. 7, 2014

(54) GAS/LIQUID MIXING DEVICE FOR DIESEL EXHAUST AFTERTREATMENT

(75) Inventor: Eric D. Thomas, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 346 days.

(21) Appl. No.: 12/715,946

(22) Filed: Mar. 2, 2010

(65) Prior Publication Data

US 2011/0214415 A1    Sep. 8, 2011

(51) Int. Cl.
*F01N 3/00* (2006.01)
(52) U.S. Cl.
USPC .............................. 60/286; 60/297; 60/303
(58) Field of Classification Search
USPC ............................................................ 60/286
See application file for complete search history.

(56) References Cited

U.S. PATENT DOCUMENTS

| | | | |
|---|---|---|---|
| 5,839,828 A | 11/1998 | Glanville | |
| 8,033,099 B2 * | 10/2011 | Ohshima et al. | 60/286 |
| 2004/0237511 A1 * | 12/2004 | Ripper et al. | 60/286 |
| 2006/0153761 A1 * | 7/2006 | Bandl-Konrad et al. | 423/239.1 |
| 2007/0035832 A1 * | 2/2007 | Hirata et al. | 359/484 |
| 2008/0011777 A1 * | 1/2008 | Cooke | 222/20 |
| 2008/0022670 A1 * | 1/2008 | Ichikawa | 60/299 |
| 2008/0302088 A1 * | 12/2008 | Koehler et al. | 60/286 |
| 2009/0004082 A1 * | 1/2009 | Takahashi et al. | 423/239.1 |
| 2010/0005790 A1 * | 1/2010 | Zhang | 60/301 |
| 2010/0107614 A1 * | 5/2010 | Levin et al. | 60/303 |

OTHER PUBLICATIONS

German Office Action dated Oct. 22, 2012, 5 pgs.

* cited by examiner

*Primary Examiner* — Thomas Denion
*Assistant Examiner* — Jason Shanske
(74) *Attorney, Agent, or Firm* — Cantor Colburn LLP

(57) ABSTRACT

An exhaust gas treatment system for an internal combustion engine comprises an exhaust gas conduit configured to receive and to deliver exhaust gas to a downstream exhaust treatment device. An injector bay extends outwardly from the exhaust gas conduit upstream of the exhaust treatment device and an exhaust fluid injector mounts through an opening in the injector bay and is in fluid communication with the exhaust gas conduit and oriented in an upstream direction to deliver an exhaust fluid to the exhaust gas in the upstream direction. An exhaust flow baffle extends outwardly from the injector bay and into the exhaust gas in an upstream direction. The exhaust flow baffle is located upstream of the exhaust fluid injector and is configured to define a turbulent, low pressure velocity field downstream thereof and proximate to the exhaust fluid injector.

14 Claims, 5 Drawing Sheets

GAS/LIQUID MIXING DEVICE FOR DIESEL EXHAUST AFTERTREATMENT

FIELD OF THE INVENTION

Exemplary embodiments of the present invention are related to exhaust gas treatment systems, and, more specifically, to an exhaust gas treatment system for internal combustion engines and vehicles incorporating the same.

BACKGROUND

Manufacturers of internal combustion engines must satisfy customer demands and meet various regulations for reduced emissions and improved fuel economy. One example of a way to improve fuel economy is to operate an engine at an air/fuel ratio that is lean (excess oxygen) of stoichiometry. Examples of lean-burn engines include compression-ignition (diesel) and lean-burn spark-ignition engines. However, while lean-burn engines may have improved fuel economy, the exhaust gas emitted from such an engine, particularly a diesel engine, is a heterogeneous mixture that contains gaseous emissions such as carbon monoxide ("CO"), unburned hydrocarbons ("HC") and oxides of nitrogen ("$NO_x$") as well as condensed phase materials (liquids and solids) that constitute particulate matter ("PM"). The commercial application of lean-burn engines has been limited due to a lack of effective methods to remove sufficient $NO_x$ from the lean exhaust gas stream before it exits the tail pipe to meet regulations. Thus, efficient reduction of $NO_x$ from lean-burn gasoline and diesel exhaust before it exits the tail pipe is important to meet future emission standards and improve vehicle fuel economy.

Several potential exhaust treatment systems have been proposed for vehicle applications. These systems employ various exhaust treatment devices. One such exhaust treatment system employs a urea selective catalyst reduction (SCR) catalyst and a $NO_x$ reductant (e.g., urea) that is injected upstream of the catalyst using a generally downstream facing fluid injector. The $NO_x$ reductant is converted to ammonia that is used to reduce $NO_x$ to $N_2$. Use of urea as a reductant necessitates a urea distribution infrastructure and an on-vehicle monitoring system for this secondary fluid. Such systems require periodic catalyst regeneration involving fuel injection or injection of reductant to regenerate the storage material of the catalyst.

An exhaust treatment technology, in use for high levels of particulate matter reduction, is the diesel particulate filter device ("DPF"). There are several known filter structures used in DPF's that have displayed effectiveness in removing the particulate matter from the exhaust gas such as ceramic honeycomb wall-flow filters, wound or packed fiber filters, open cell foams, sintered metal fibers, etc. Ceramic wall flow filters have experienced significant acceptance in automotive applications. The filter is a physical structure for removing particulates from exhaust gas and, as a result, the accumulation of filtered particulates will have the effect of increasing the exhaust system backpressure experienced by the engine. To address backpressure increases caused by the accumulation of exhaust gas particulates, the DPF is periodically cleaned, or regenerated. Regeneration of a DPF in vehicle applications is typically automatic and is controlled by an engine or other controller based on signals generated by engine and exhaust system sensors. The regeneration event involves increasing the temperature of the DPF to levels that are often above 600° C. in order to burn the accumulated particulates.

One method of generating the temperatures required in the exhaust system for regeneration of the DPF is to deliver unburned HC to an oxidation catalyst device disposed upstream of the DPF. The HC may be delivered by injecting fuel directly into the exhaust gas system typically using a downstream facing exhaust fluid injector. The HC is oxidized in the oxidation catalyst device resulting in an exothermic reaction that raises the temperature of the exhaust gas. The heated exhaust gas travels downstream to the DPF and burns the particulate accumulation.

While systems that employ SCR catalysts and DPFs have been used for $NO_x$ and particulate reduction in exhaust gas flow streams, the packaging of the various devices has been problematic, particularly in relatively smaller vehicles having relatively shorter wheelbases, due to the reduced space available to package the desired combinations of devices and the associated injection systems required for the introduction of various exhaust treatment fluids. In some cases there is not enough room to package the catalyst and filter devices while also providing the needed mixing length for conversion of the injected urea into ammonia and vaporization of HC, particularly if the system also employs multiple exhaust treatment devices for the reduction of, or oxidation of, other exhaust constituents, including carbon monoxide (CO), various hydrocarbons (HC), particulate matter (PM) and the like.

SUMMARY OF THE INVENTION

In an exemplary embodiment, an exhaust gas treatment system for an internal combustion engine comprises an exhaust gas conduit configured to receive exhaust gas from an exhaust port of an internal combustion engine and to deliver the exhaust gas downstream to an exhaust treatment device. An injector bay extends outwardly from the exhaust gas conduit upstream of the exhaust treatment device and an exhaust fluid injector mounts through an opening in the injector bay and is in fluid communication with the exhaust gas conduit and oriented in an upstream direction to deliver an exhaust fluid to the downstream flowing exhaust gas in the upstream direction. An exhaust flow baffle extends outwardly from the injector bay and into the exhaust gas in an upstream direction. The exhaust flow baffle is located upstream of the exhaust fluid injector and is configured to define a turbulent low pressure velocity field downstream thereof and proximate to the exhaust fluid injector.

In another exemplary embodiment, an exhaust gas treatment system for an internal combustion engine comprises an exhaust gas conduit configured to receive exhaust gas from an exhaust port of an internal combustion engine and to deliver the exhaust gas downstream to a plurality of exhaust treatment devices. A selective catalytic reduction device is configured to reduce oxides of nitrogen in the exhaust gas. An injector bay extending outwardly from the exhaust gas conduit is located upstream of the selective catalytic reduction device and exhaust fluid injector is mounted through an opening in the injector bay in fluid communication with the exhaust gas conduit and oriented in an upstream direction to deliver an ammonia reductant to the exhaust gas in the upstream direction. An exhaust flow baffle extends outwardly from the injector bay into the exhaust gas in an upstream direction. The exhaust flow baffle is located upstream of the exhaust fluid injector and is configured to define a turbulent low pressure velocity field downstream thereof and proximate to the ammonia reductant delivery.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

Other features, advantages and details appear, by way of example only, in the following description of embodiments, the description referring to the drawings in which.

DESCRIPTION OF THE EMBODIMENTS

Figure 1:
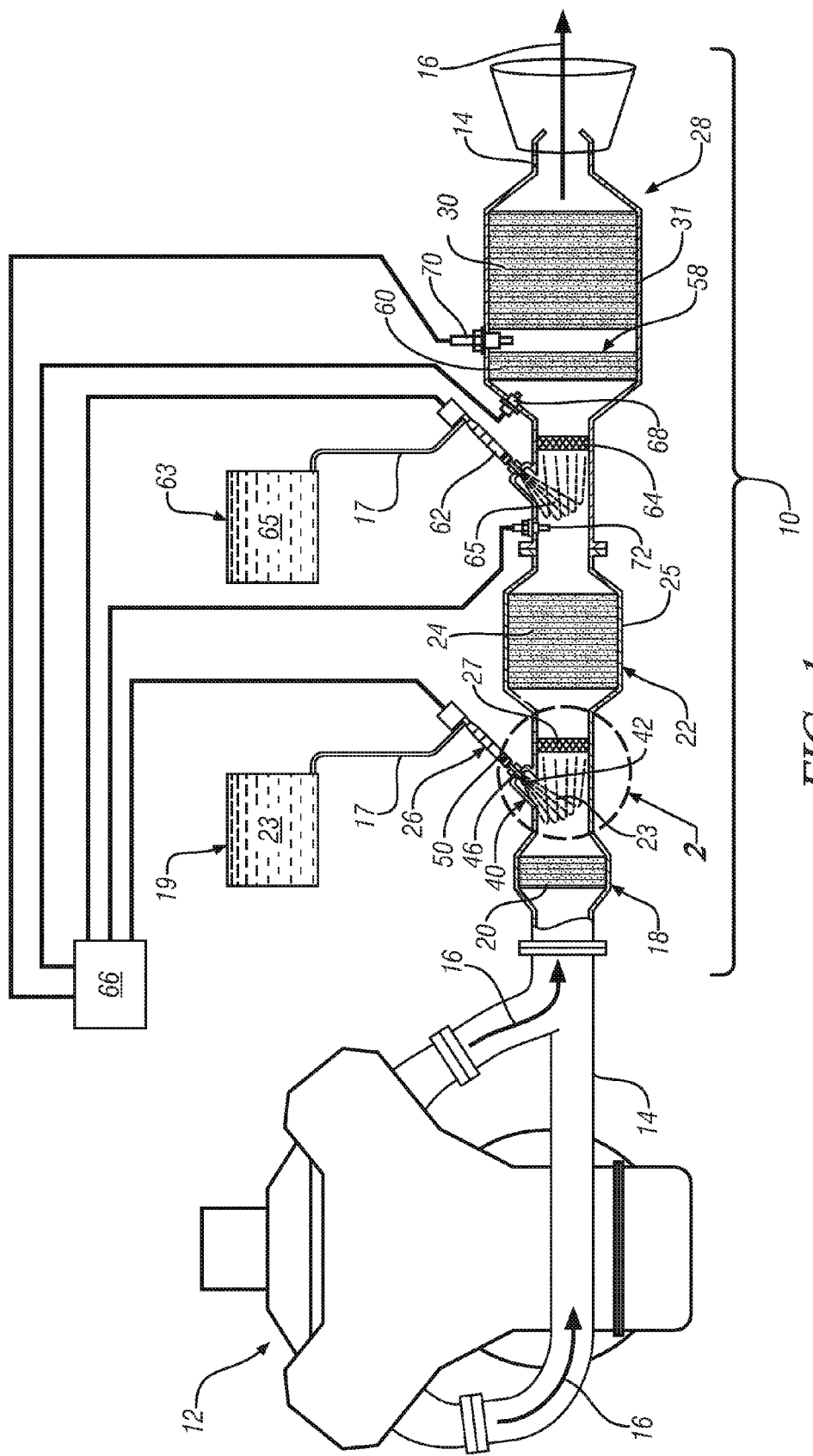
FIG. 1 is a schematic partial cross-sectional illustration of an exemplary embodiment of an internal combustion engine and exhaust gas treatment system as disclosed herein.

The following description is merely exemplary in nature and is not intended to limit the present disclosure, application or uses. It should be understood that throughout the drawings, corresponding reference numerals indicate like or corresponding parts and features.

Referring now to FIG. 1, an exemplary embodiment of the invention is directed to an exhaust gas treatment system, referred to generally as 10, for the reduction of regulated exhaust gas constituents of an internal combustion engine, such as diesel engine 12. It is appreciated that the diesel engine 12 is merely exemplary in nature and that the invention described herein can be implemented in various engine systems implementing an exhaust particulate filter. Such engine systems may include, but are not limited to, gasoline direct injection systems and homogeneous charge compression ignition engine systems. For ease of description and discussion, the disclosure will be discussed in the context of diesel engine 12.

The exhaust gas treatment system includes an exhaust gas conduit 14, which may comprise several segments that function to transport exhaust gas 16 from the diesel engine 12 to the various exhaust treatment devices of the exhaust gas treatment system 10. The exhaust treatment devices may include a first diesel oxidation catalyst device ("DOC1") 18. The DOC1 may include a flow-through metal or ceramic monolith substrate 20 that is wrapped in an intumescent mat (not shown) that expands when heated, securing and insulating the substrate which is packaged in a stainless steel shell or canister 21 having an inlet and an outlet in fluid communication with exhaust gas conduit 14. The substrate 20 has an oxidation catalyst compound (not shown) disposed thereon. The oxidation catalyst compound may be applied as a washcoat and may contain platinum group metals such as platinum (Pt), palladium (Pd), rhodium (Rh) or other suitable oxidizing catalysts, or combination thereof. The DOC1 18 is useful in treating unburned gaseous and non-volatile HC and CO, which are oxidized to form carbon dioxide and water.

A selective catalytic reduction device ("SCR") 22 may be disposed downstream of the DOC1 18. In a manner similar to the DOC1, the SCR 22 may also include a flow-through ceramic or metal monolith substrate 24 that is wrapped in an intumescent mat (not shown) that expands when heated, securing and insulating the substrate which is packaged in a stainless steel shell or canister 25 having an inlet and an outlet in fluid communication with exhaust gas conduit 14. The substrate 24 has an SCR catalyst composition (not shown) applied thereto. The SCR catalyst composition preferably contains a zeolite and one or more base metal components such as iron ("Fe"), cobalt ("Co"), copper ("Cu") or vanadium which can operate efficiently to convert $NO_x$ constituents in the exhaust gas 16 in the presence of an injected exhaust fluid such as an ammonia ("$NH_3$") reductant. The $NH_3$ reductant 23, supplied from reductant supply tank 19 through conduit 17, may be injected into the exhaust gas conduit 14 at a location upstream of the SCR 22 using an upstream oriented or facing injector 26. The reductant may be in the form of a liquid or an aqueous urea solution when it is delivered to the exhaust gas 16 by the upstream oriented or facing injector 26. A mixer or turbulator 27 may also be disposed within the exhaust conduit 14 in close downstream proximity to the upstream facing injector 26 to further assist in thorough mixing of the reductant 23 with the exhaust gas 16.

In one exemplary embodiment, an exhaust gas filter assembly, in this case a diesel particulate filter device ("DPF") 28 is located within the exhaust gas treatment system 10, downstream of the SCR 22 and operates to filter the exhaust gas 16 of carbon and other particulates. The DPF 28 may be constructed using a ceramic wall-flow monolith filter 30 that is wrapped in an intumescent mat that expands when heated, securing and insulating the filter which is packaged in a stainless steel shell or canister 31 having an inlet and an outlet in fluid communication with exhaust gas conduit 14. Exhaust gas 16 entering the filter 30 is forced to migrate through adjacent longitudinally extending walls (not shown) and, it is through this wall-flow mechanism that the exhaust gas 16 is filtered of carbon and other particulates. The filtered particulates are deposited in the filter 30 and, over time, will have the effect of increasing the exhaust gas backpressure experienced by the diesel engine 12. It is appreciated that a ceramic wall-flow monolith filter 30 is merely exemplary in nature and that the DPF 28 may include other filter devices such as wound or packed fiber filters, open cell foams, sintered metal fibers, etc.

In an exemplary embodiment, the increase in exhaust backpressure caused by the accumulation of particulate matter requires that the DPF 28 is periodically cleaned, or regenerated. Regeneration involves the oxidation or burning of the accumulated carbon and other particulates in what is typically a high temperature (>600° C.) environment. For regeneration purposes a second diesel oxidation catalyst device ("DOC2") 58 may be located upstream of the filter 30, proximate to its upstream end. In the embodiment illustrated in FIG. 1, the DOC2 58 is a flow-through metal or ceramic monolith substrate 60 that is wrapped in an intumescent mat (not shown) that expands when heated, securing and insulating the substrate which is packaged in the canister 31 of the DPF 28. The substrate 20 has an oxidation catalyst compound (not shown) disposed thereon. The oxidation catalyst compound may be applied as a wash coat and may contain platinum group metals such as platinum (Pt), palladium (Pd), rhodium (Rh) or other suitable oxidizing catalysts, or combination thereof. While the embodiment described includes the DOC2 58 disposed in the canister 31 of the DPF 28, it is contemplated that, depending on packaging and other system constraints, the DOC2 58 may also be disposed within a separate canister (not shown) that is located upstream of the DPF 28.

Disposed upstream of the DPF 28, in fluid communication with the exhaust gas 16 in the exhaust gas conduit 14, is an upstream oriented or facing HC or fuel injector 62. The fuel injector 62, in fluid communication with HC 65 in fuel supply tank 63 through fuel conduit 61, is configured to introduce unburned HC 65 into the exhaust gas stream for delivery to the DOC2 58 associated with the DPF 28. A mixer or turbulator 64 may also be disposed within the exhaust conduit 14, in close, downstream proximity to the HC injector 62, to further assist in thorough mixing of the HC with the exhaust gas 16.

A controller such as vehicle controller 66 is operably connected to, and monitors, the exhaust gas treatment system 10 through signal communication with a number of sensors. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality.

In an exemplary embodiment, a backpressure sensor 68, located upstream of DPF 28, generates a signal indicative of the carbon and particulate loading in the ceramic wall flow monolith filter 30. Upon a determination that the backpressure has reached a predetermined level indicative of the need to regenerate the DPF 28, the controller 66 activates the HC injector 62 to deliver HC 65 into the exhaust gas conduit 14 for mixing with the exhaust gas 16. The fuel/exhaust gas mixture enters the DOC2 58 inducing oxidation of the HC in the exhaust gas 16 and raising the exhaust gas temperature to a level (e.g. >600° C.) suitable for regeneration of the carbon and particulate matter in the filter 30. The controller 66 may monitor the temperature of the exothermic oxidation reaction in the DOC2 58 and the ceramic wall-flow monolith filter 30 through temperature sensor 70 and adjust the HC delivery rate of injector 62 to maintain a predetermined temperature.

Similarly, a $NO_x$ sensor 72 located downstream of the SCR 22 generates a signal indicative of the $NO_x$ levels in the exhaust gas 16 exiting the SCR 22. Upon a determination that the $NO_x$ levels have reached a predetermined level the controller 66 activates the injector 26 to deliver reductant 23 into the exhaust gas conduit 14 for mixing with the exhaust gas 16. The ammonia/exhaust gas mixture enters the SCR 22 where the ammonia reduces the $NO_x$ to $N_2$.

Figure 2:
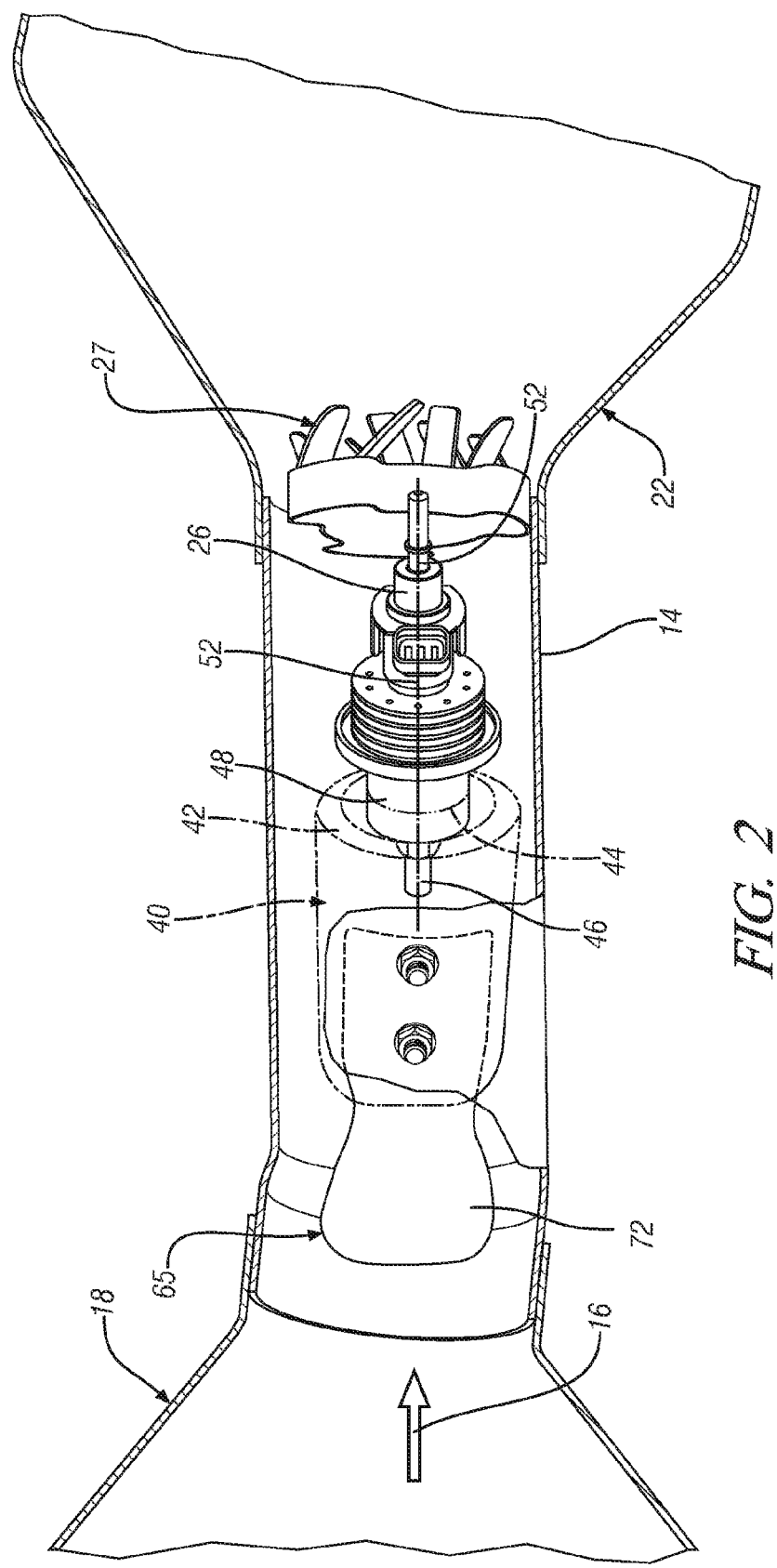
FIG. 2 is an enlarged, partial cross-sectional perspective view of the exhaust gas treatment system of FIG. 1, taken at circle 2, with certain features shown in phantom for purposes of description.
Figure 3:
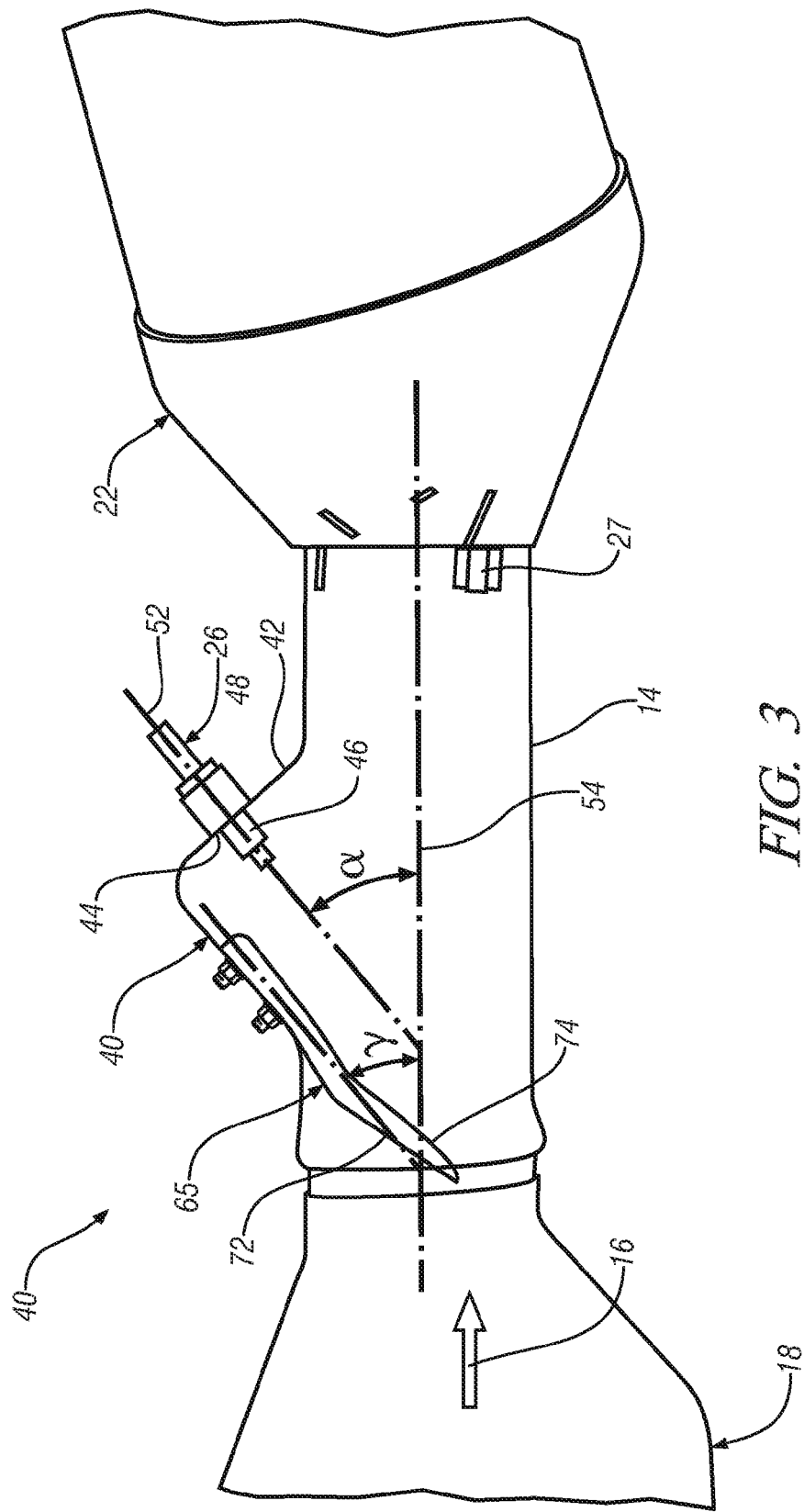
FIG. 3 is an enlarged, partial cross-sectional side view of the exhaust gas treatment system of FIG. 1 taken at circle 2.
Figure 4:
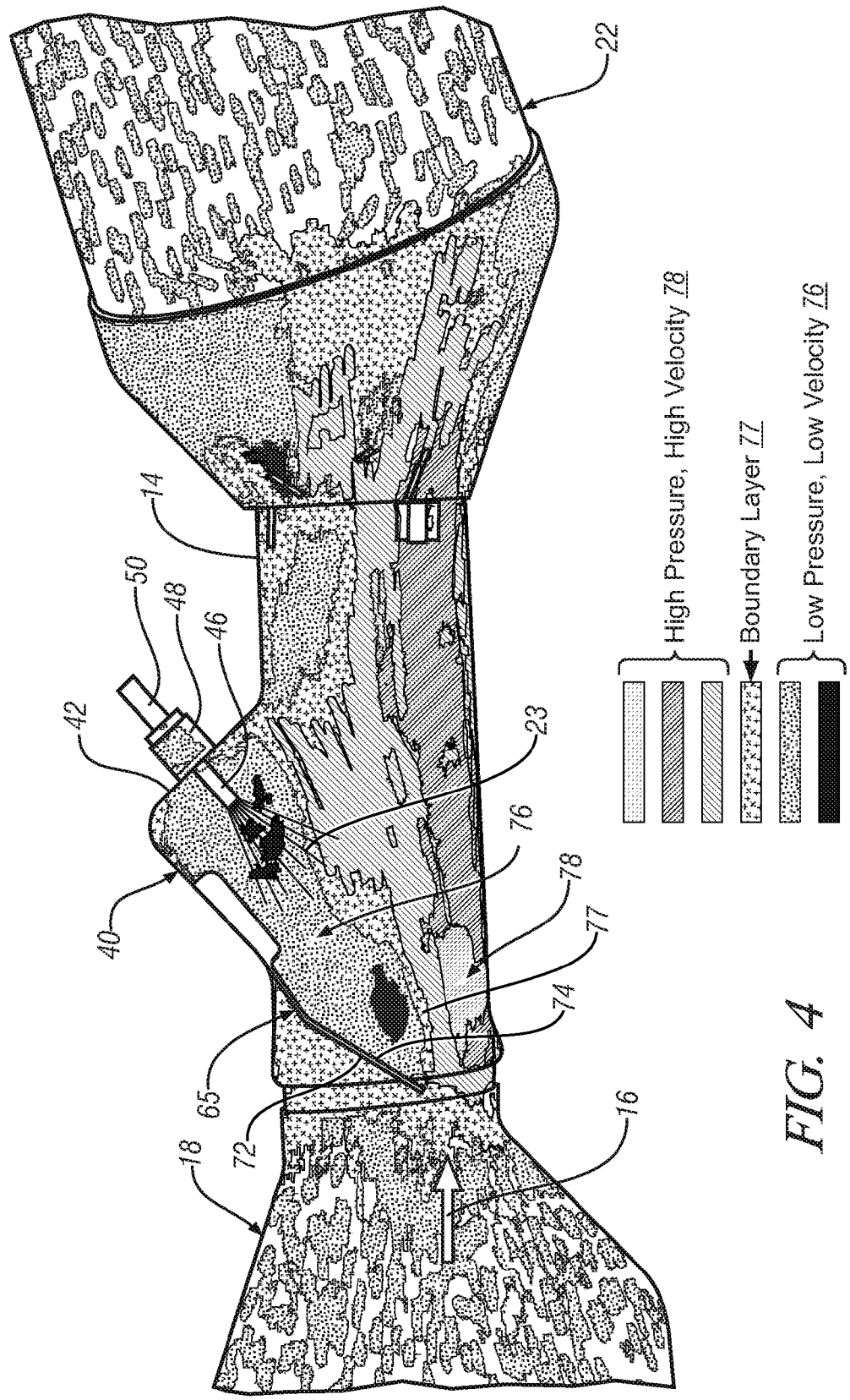
FIG. 4 is an enlarged, partial cross-sectional side view of the exhaust gas treatment system of FIG. 1 taken at circle 2, illustrating exhaust flow characteristics therein.

In an exemplary embodiment, and referring to FIGS. 2 and 3, enlarged views are shown of a portion of the exhaust gas conduit 14 of the exhaust gas treatment system 10 in which the ammonia reductant injector 26 is located in an upstream facing configuration. The views have been chosen to illustrate features of the ammonia reductant injector 26; however, similar features and descriptions may also apply to the mounting, orientation and operation of the HC injector 62. The exhaust gas conduit 14 includes an injector bay 40 that may be formed in the conduit or attached thereto as by welding or the like. The injector bay 40 includes an injector mounting flange 42 having an opening 44 formed therein for receiving the injection portion or tip 46 of injector 26 therein. A sealing collar 48 encircles the injector 26 to define a seal between the injector and the exhaust gas conduit 14 to thereby prevent leakage of exhaust gas 16 therebetween while fixing the injector 26 in place. The configuration of the injector bay 40 and orientation of the mounting flange 42 cooperate to orient the injector 26 in an upstream facing manner such that the axis 52 of the injector 26 is at an angle α, FIG. 3, with respect to the axis 54 of the exhaust gas conduit 14. The angle α (alpha) is preferably in a range from about 40° to about 70°, depending on exhaust characteristics such as flow volume and speed.

Figure 5:
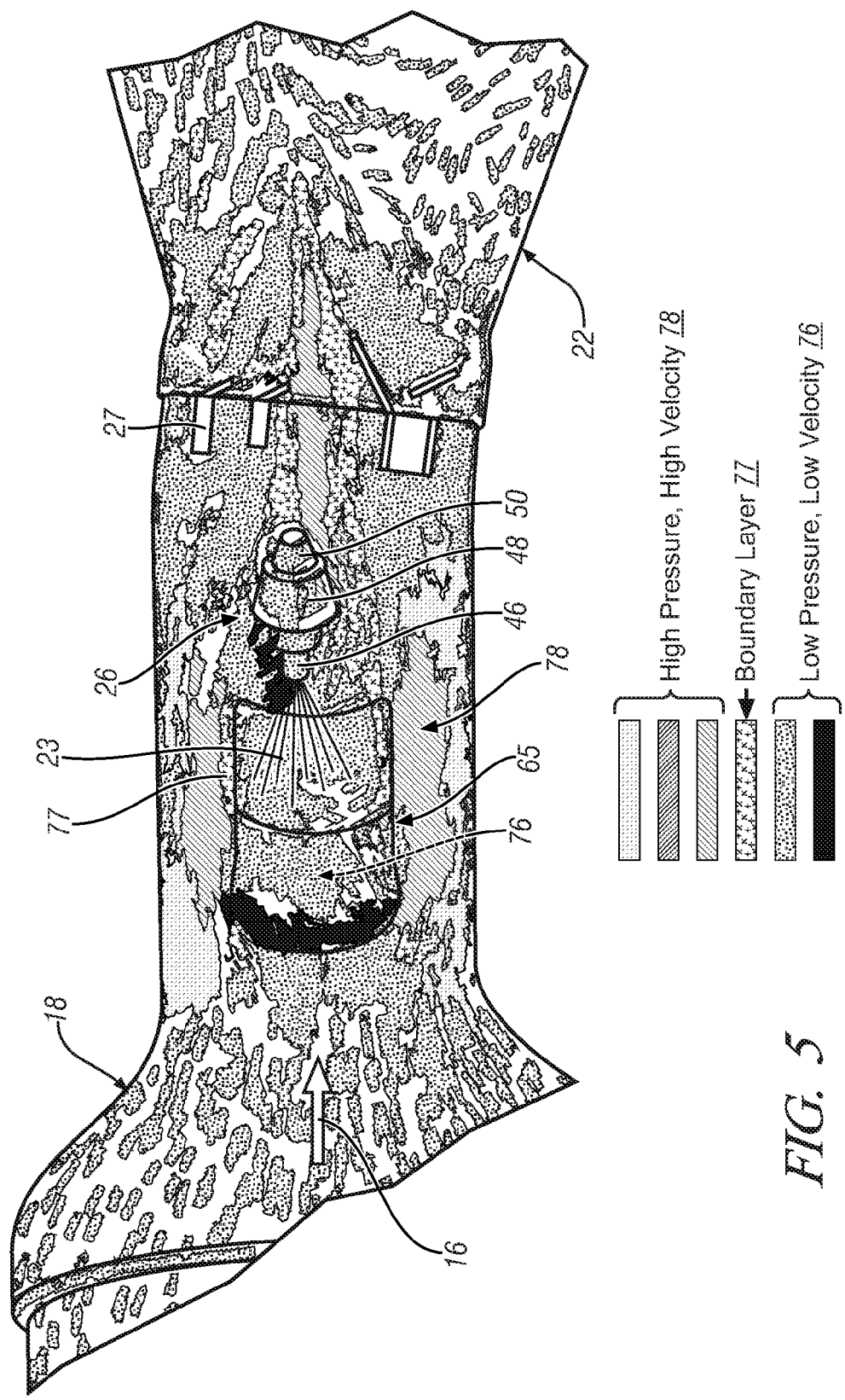
FIG. 5 is an enlarged, partial cross-sectional plan view of the exhaust gas treatment system of FIG. 1 taken at circle 2, illustrating exhaust flow characteristics therein.

Extending outwardly from the injector bay 40 into the exhaust gas 16 flow upstream of the injection portion or tip 46 of the injector 26 is an exhaust flow baffle 65. The baffle 65 extends in an upstream direction at an angle γ (gamma) that configures the baffle in the exhaust gas 16 flow generally parallel to the axis 52 of the injector 26. The upstream facing surface 72 of the exhaust flow baffle 65 has an outwardly facing (in the upstream direction) convex arcuate configuration that in some respects resembles the back side of a shoehorn. The arcuate upstream face 72 is configured to separate the downstream flow of exhaust gas 16 about the exhaust flow baffle 65. The separation of the exhaust gas 16 flow around the exhaust flow baffle 65 will have the effect of increasing both the speed and the pressure of the exhaust gas 16 into higher pressure, higher velocity zones 78, relative to the exhaust gas pressure upstream of the baffle 65. A downstream facing surface 74 of the exhaust flow baffle 65 is convex or C-shaped and defines a turbulent low pressure, low velocity field 76, FIG. 5, downstream of the exhaust flow baffle into which the ammonia reductant 23 is sprayed with an upstream orientation. The turbulent low pressure, low velocity field 76 is a relatively stagnant zone, downstream of the exhaust flow baffle 65 into which the higher speed exhaust gas velocity field 78 collapses towards the center of the exhaust gas conduit 14 thereby entraining the droplets of the ammonia reductant 23 into the exhaust gas 16 flow in a uniform distribution without impingement of the spray onto surfaces of the exhaust gas treatment system 10. The collapse of the high speed exhaust gas velocity field 78 downstream of the exhaust flow baffle 65 gives the turbulent low pressure, low velocity field 76 a pressure characteristic that borders on suction allowing the entrained ammonia reductant 23, or other exhaust fluid droplets (ex. HC in the case of HC injector 62), to become spatially distributed therein and subsequently entrained by the high velocity field 78, at the boundary layer 77, and carried downstream to the SCR 22, or other catalyst device of the exhaust treatment system 10.

The use of an upstream facing injector 26, 62 with the baffle 65 allows injection of exhaust fluids such as ammonia reductant 23 or HC 65 in a shorter axial length and with less flow resistance to the flow of exhaust gas 16 than with more conventional mixer devices 27, 64 which must otherwise be oriented downstream or perpendicular to the flow of exhaust gas 16. In some cases the conventional mixer devices 27, 64 may be eliminated. In addition, the entrainment of the ammonia 23 spray provides adequate transport time in the exhaust gas for required reactions (ex. conversion to $NH_3$) to occur prior to entry of the exhaust gas into the SCR 22, for instance. Additionally, the use of the baffle 65 facilitates the use of an upstream facing or oriented injector 26 or 62 which would not otherwise be possible due to deposit formation and excessive temperatures at the injection tip 46 caused by unshielded impingement of the exhaust gas 16 thereon.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust gas treatment system for an internal combustion engine comprising:
   an exhaust gas conduit having a central longitudinal axis and configured to receive exhaust gas from an exhaust port of an internal combustion engine and to deliver the exhaust gas downstream to an exhaust treatment device;
   an injector bay extending outwardly from the exhaust gas conduit upstream of the exhaust treatment device;
   an exhaust fluid injector mounted through an opening in the injector bay, in fluid communication with the exhaust gas in the exhaust gas conduit, and oriented in an upstream direction to deliver an exhaust fluid to the downstream flowing exhaust gas in the upstream direction; and
   an exhaust flow baffle extending outwardly from the injector bay into the exhaust gas and extending past the central longitudinal axis in an upstream direction, the exhaust flow baffle having an arcuate upstream face that is outwardly facing in the upstream direction and configured to separate the flow of exhaust gas thereabout, the exhaust flow baffle located upstream of the exhaust fluid injector and extending into the exhaust gas conduit from within the injector bay to define a turbulent, low pressure, low velocity field downstream thereof and proximate to the exhaust fluid injector and operable to entrain the delivered exhaust fluid, wherein the exhaust fluid is sprayed into the turbulent, low pressure, low velocity field, and wherein the exhaust flow baffle is coupled to a wall of the injector bay.

2. The exhaust treatment system of claim 1, the exhaust flow baffle further comprising:
   a convex downstream face configured to define the turbulent, low pressure, low velocity field downstream of the exhaust flow baffle.

3. The exhaust treatment system of claim 1, wherein the exhaust fluid injector is oriented in the upstream direction at an angle $\alpha$ to an axis of the exhaust gas conduit.

4. The exhaust treatment system of claim 3, wherein the angle $\alpha$ is in a range from about 40° to about 70°.

5. The exhaust treatment system of claim 1, wherein the exhaust flow baffle is oriented in the upstream direction at an angle $\gamma$ to an axis of the exhaust gas conduit.

6. The exhaust treatment system of claim 5, wherein the angle $\gamma$ is in a range from about 40° to about 70°.

7. The exhaust treatment system of claim 1, wherein the exhaust fluid injector is oriented in the upstream direction at an angle $\alpha$ to an axis of the exhaust gas conduit and wherein the exhaust flow baffle is oriented in the upstream direction at an angle $\gamma$ to an axis of the exhaust gas conduit.

8. The exhaust treatment system of claim 7, wherein the angle $\alpha$ and the angle $\gamma$ are about equal.

9. The exhaust treatment system of claim 1, wherein the downstream exhaust treatment device comprises a selective catalytic reduction device and the exhaust fluid comprises an ammonia reductant.

10. The exhaust treatment system of claim 1, wherein the downstream exhaust treatment device comprises an oxidation catalyst device and the exhaust fluid comprises hydrocarbon.

11. An exhaust gas treatment system for an internal combustion engine comprising:
    an exhaust gas conduit configured to receive exhaust gas from an exhaust port of an internal combustion engine and to deliver the exhaust gas downstream to a plurality of exhaust treatment devices;
    a selective catalytic reduction device configured to reduce oxides of nitrogen in the exhaust gas;
    an injector bay extending outwardly from the exhaust gas conduit upstream of the selective catalytic reduction device;
    an exhaust fluid injector mounted through an opening in the injector bay, in fluid communication with the exhaust gas in the exhaust gas conduit, and oriented in an upstream direction to deliver an ammonia reductant to the downstream flowing exhaust gas in the upstream direction; and
    an exhaust flow baffle extending outwardly from the injector bay into the exhaust gas in an upstream direction and oriented in a direction substantially parallel with the exhaust fluid injector and the injector bay, the exhaust flow baffle located upstream of the exhaust fluid injector and extending into the exhaust gas conduit from within the injector bay to define a turbulent, low pressure, low velocity field downstream thereof proximate to the exhaust fluid injector, wherein the exhaust fluid is sprayed into the turbulent, low pressure, low velocity field, and wherein the exhaust flow baffle is oriented in a direction substantially parallel with the exhaust fluid injector such that an axis of the injector does not intersect the exhaust flow baffle within the exhaust gas conduit.

12. The exhaust gas treatment system of claim 11, further comprising:
    an oxidation catalyst device configured to oxidize hydrocarbon in the exhaust gas and to increase the temperature thereof;
    an injector bay extending outwardly from the exhaust gas conduit upstream of the oxidation catalyst device;
    an exhaust fluid injector mounted through an opening in the injector bay, in fluid communication with the exhaust gas in the exhaust gas conduit, and oriented in an upstream direction to deliver hydrocarbon to the downstream flowing exhaust gas in the upstream direction;
    an exhaust flow baffle extending outwardly from the injector bay into the exhaust gas in an upstream direction, the exhaust flow baffle located upstream of the exhaust fluid injector and configured to define a turbulent, low pressure, low velocity field downstream thereof proximate to the exhaust fluid injector; and
    an exhaust particulate filter downstream of the oxidation catalyst device and configured to receive the increased temperature exhaust gas for combustion of particulates therein.

13. The exhaust gas treatment system of claim 12, each of the exhaust flow baffles further comprising:
    an arcuate upstream face configured to separate the flow of exhaust gas thereabout; and
    a concave downstream face configured to define the turbulent low pressure, low velocity fields downstream of the exhaust flow baffles.

14. The exhaust gas treatment system of claim 12, wherein axes of the baffles are parallel to axes of the ammonia reductant and the hydrocarbon exhaust fluid injectors.

* * * * *